(12) United States Patent
Lee

(10) Patent No.: US 6,370,193 B1
(45) Date of Patent: Apr. 9, 2002

(54) MPEG DATA COMPRESSION AND DECOMPRESSION USING ADJACENT DATA VALUE DIFFERENCING

(75) Inventor: Yong-Woon Lee, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/031,212

(22) Filed: Feb. 26, 1998

(30) Foreign Application Priority Data

Feb. 26, 1997 (KR) ............................................. 97-5916

(51) Int. Cl.[7] ................................................. H04B 1/66
(52) U.S. Cl. ................................................. 375/240.15
(58) Field of Search .......................... 348/384.1, 390.1, 348/342.1, 401, 402.1–405.1, 406.1, 416.1, 420.1, 423.1, 426.1; 364/578; 382/232; 375/240, 240.01, 240.02, 240.03, 240.09, 240.1, 240.11, 240.12, 240.13, 240.14; H04B 1/66

(56) References Cited

U.S. PATENT DOCUMENTS

| | | | | |
|---|---|---|---|---|
| 5,223,949 A | * | 6/1993 | Honjo ......................... | 358/426 |
| 5,715,176 A | * | 2/1998 | Mobini .................... | 364/514 R |
| 5,729,293 A | * | 3/1998 | Keesman .................... | 348/401 |
| 5,742,347 A | * | 4/1998 | Kandlur et al. ............. | 348/426 |
| 5,831,677 A | * | 11/1998 | Streater ....................... | 348/415 |
| 5,832,037 A | * | 11/1998 | Park ............................ | 375/240 |
| 5,838,597 A | * | 11/1998 | Pau et al. .............. | 364/715.02 |
| 5,844,608 A | * | 12/1998 | Yu et al. ....................... | 348/390 |
| 5,847,762 A | * | 12/1998 | Candfield et al. ........... | 348/415 |
| 5,959,690 A | * | 9/1999 | Toebes, VIII et al. ....... | 348/576 |
| 5,973,742 A | * | 10/1999 | Gardyne et al. ............ | 348/416 |
| 6,023,295 A | * | 2/2000 | Pau ............................ | 348/405 |
| 6,028,635 A | * | 2/2000 | Owen et al. ................ | 348/403 |
| 6,038,345 A | * | 3/2000 | Osava et al. ................ | 382/232 |

* cited by examiner

Primary Examiner—Chris Kelley
Assistant Examiner—Tung Vo
(74) Attorney, Agent, or Firm—Myers Bigel Sibley & Sajovec

(57) ABSTRACT

MPEG data is compressed by obtaining difference values between succeeding adjacent data values of MPEG video data and store the difference value if the difference value is less than a predetermined range. By storing the difference values rather than the data values if the difference value is less than a predetermined range, compression may be provided for MPEG data. More specifically, a series of data values of MPEG video data is separated from an MPEG bitstream. Difference values are obtained between succeeding adjacent data values of the MPEG video data. For each data value, the data value is stored if the difference exceeds a predetermined range, and the difference value is stored if the difference value is less than the predetermined range. A conversion flag is also stored for each data value, to indicate whether the data value or the difference value is stored. After the data value or difference value is stored for each data value, a determination is made if the data values and difference values that were stored exceed a predetermined size. Each data value is divided by 2, and the divided data values are stored if the data values and difference values that were stored exceed the predetermined size. On the other hand, if the data values and difference values that were stored are less than the predetermined size, dummy bits may be added to the data, so that the data that was stored equals the predetermined size. A mode flag may be used to indicate whether difference values or divided values are stored.

49 Claims, 10 Drawing Sheets

MPEG DATA COMPRESSION AND DECOMPRESSION USING ADJACENT DATA VALUE DIFFERENCING

FIELD OF THE INVENTION

This invention relates to MPEG multimedia data, and more preferably to compression and decompression of MPEG data.

BACKGROUND OF THE INVENTION

Multimedia data including audio, still video and motion video data is being widely used in video games, internet-related applications and other data processing related applications. As is well known to those having skill in the art, multimedia applications often require large quantities of video and audio data. In order to store and process large quantities of data, international standards for coding audio and video data have been prepared by the Moving Picture Expert Group (MPEG). Examples of MPEG standards are MPEG-1 and MPEG-2 standards. MPEG standards are widely used with multimedia data and need not be described further herein.

MPEG-1 or MPEG-2 standard data that has been compressed may be restored or decompressed using an MPEG-1 or MPEG-2 decoder. More specifically, MPEG data may include intra picture data, predictive picture data and bidirectionally predictive picture data. Moreover, each picture generally includes a luminance signal and a chrominance signal. Accordingly, notwithstanding the existence of MPEG compression and decompression, large size memories may still be needed to store multimedia data.

In one specific example, if the number of horizontal pixels are 720 and 480 respectively, the numerical value for discrimination between black/white and color signal is 2, and the number of bits per pixel is 8, in order to store all of the intra picture, predictive picture and bidirectionally predictive picture data, the total amount of data to be stored may become 720×480×3×8×2 or 15.2 Mbits. Accordingly, 15.2 Mbits of data may need to be stored in a memory to process the three pictures.

FIG. 1 is a block diagram of a conventional MPEG system decoder. Referring to FIG. 1, a conventional MPEG system decoder includes an MPEG bitstream decoder 10, a memory management processor 12, a memory 14, an MPEG video restorer 16 (decompressor), and a video output processor 18. The video output processor 18 provides video data to a display, such as a TV. It will be understood that the block diagram of FIG. 1 illustrates only blocks for processing video data.

The MPEG bitstream decoder 10 receives an MPEG bitstream and separates the bitstream into video data, audio data, and system data. The memory 14 stores therein compressed video and audio data, and restored video and audio data. The MPEG video restorer 16 restores the compressed video data output from the memory 14 and provides the restored video data to the memory 14. The memory management processor 12 controls the generation of addresses for storing or reading data in/out of the memory 14. The video output processor 18 outputs the restored video data from the memory 14 to a video display.

A data processing method performed by a conventional MPEG system decoder of FIG. 1 will now be described. Specifically, the memory management processor 12 stores the MPEG-compressed video data separated by and output from the MPEG bitstream decoder 10 in a compressed video data storage region of the memory 14. The memory management processor 12 then outputs the MPEG-compressed video data stored in the memory 14 to the MPEG video restorer 16. The MPEG video restorer 16 restores the MPEG-compressed video data. The memory management processor 12 stores the video data restored by the MPEG video restorer 16 in a restored video data storage region of the memory 14. The memory management processor 12 outputs the restored data stored in the memory 14 to the video output processor 18.

As described above, according to a conventional data processing method performed by a conventional MPEG system decoder, the video data restored by the MPEG video restorer 16 is stored in the memory 14 as is. Unfortunately, the storing of video data in the memory 14 may require an excessive amount of storage capacity. The large storage capacity may increase the cost and/or decrease the performance of the system that processes MPEG data.

SUMMARY OF THE INVENTION

It is therefore an object of the present invention to provide improved storage of MPEG data.

It is another object of the invention to provide compression of MPEG data to allow reduction in the storage space that need be used by the data.

These and other objects are provided, according to the present invention, by methods, systems or apparatus and computer program products that compress MPEG data by obtaining difference values between succeeding adjacent data values of MPEG video data and store the difference value if the difference value is less than a predetermined range. By storing the difference values rather than the data values if the difference value is less than a predetermined range, compression may be provided for MPEG data.

More specifically, according to the present invention, a series of data values of MPEG video data is separated from an MPEG bitstream. Difference values are obtained between succeeding adjacent data values of the MPEG video data. For each data value, the data value is stored if the difference exceeds a predetermined range, and the difference value is stored if the difference value is less than the predetermined range. A conversion flag is also stored for each data value, to indicate whether the data value or the difference value is stored. As an example, the predetermined range may be between −9 and 8.

According to another aspect of the present invention, after the data value or difference value is stored for each data value, a determination is made if the data values and difference values that were stored exceed a predetermined size. Each data value is divided by 2, and the divided data values are stored if the data values and difference values that were stored exceed the predetermined size. On the other hand, if the data values and difference values that were stored are less than the predetermined size, dummy bits may be added to the data, so that the data that was stored equals the predetermined size. A mode flag may be used to indicate whether difference values or divided values are stored.

Accordingly, MPEG data may be compressed by separating a series of n data values of m bits each of MPEG video data from an MPEG bitstream to obtain m×n bits of MPEG video data. The m×n bits of MPEG video data are compressed into (m×n)−n bits using adjacent value differencing and data value dividing. The (m×n)−n bits of compressed MPEG video data is stored.

Preferably, the (m×n)−n bits of compressed MPEG video data include n 1-bit conversion flags to indicate whether the data value or the difference value is stored for each of the n data values. A plurality of dummy bits are also preferably included, if needed, to increase the size of the compressed video data to (m×n)–n bits. Finally, the (m×n)–n bits of compressed MPEG video data also preferably include a 1-bit mode flag, to indicate whether difference values or divided values are stored.

The compressed MPEG data may be decompressed or restored by adding a compressed data value to an immediately preceding decompressed data value to obtain an associated decompressed data value if the conversion flag that is associated with the data value indicates that the difference is stored. Adjacent data value adding is preferably performed only if the mode flag has a first value to indicate that differencing was used in compression. If the mode flag has a second value, indicating that dividing was used to compress, then each compressed data value is multiplied by 2 to decompress the data.

Accordingly, (m×n)–n bits of compressed MPEG video data are decompressed into a series of n data values of m bits each of decompressed MPEG video data using adjacent data value adding and data value multiplying. The (m×n)–n bits of compressed MPEG video data include n 1-bit conversion flags to indicate whether the data value or adjacent data value adding is used to decompress each of the n data values. The (m×n)–n bits of compressed MPEG video data also preferably include a plurality of dummy bits that increase the size of the compressed MPEG video data to (m×n)–n bits, if needed. A 1-bit mode flag is also preferably included to indicate whether difference values or divided values are stored.

Accordingly, the storage capacity of a memory that stores MPEG video data may be reduced by compressing the restored data using differencing and division and then decompressing the stored data as needed. As will be appreciated by those of skill in the art, the present invention may be embodied as methods, apparatus (systems) and/or computer program products.

BRIEF DESCRIPTION OF THE DRAWINGS

FIGS. 7A to 7D are views explaining data compression utilizing data compression of FIGS. 6A and 6B.

DETAILED DESCRIPTION OF PREFERRED EMBODIMENTS

The present invention now will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will also be appreciated by one of skill in the art, the present invention may be embodied as methods, MPEG compression/decompression systems (apparatus), or computer program products. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Figure 1:
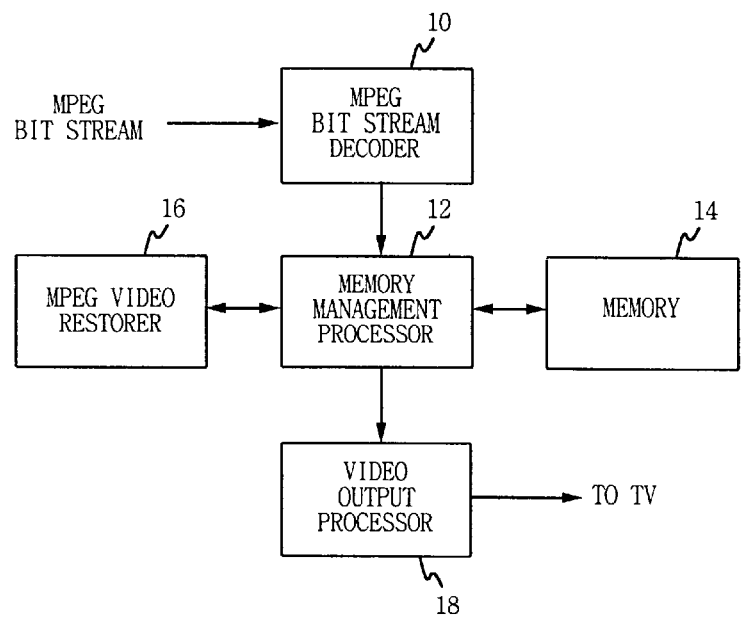
FIG. 1 is a block diagram of a conventional MPEG system decoder.
Figure 2:
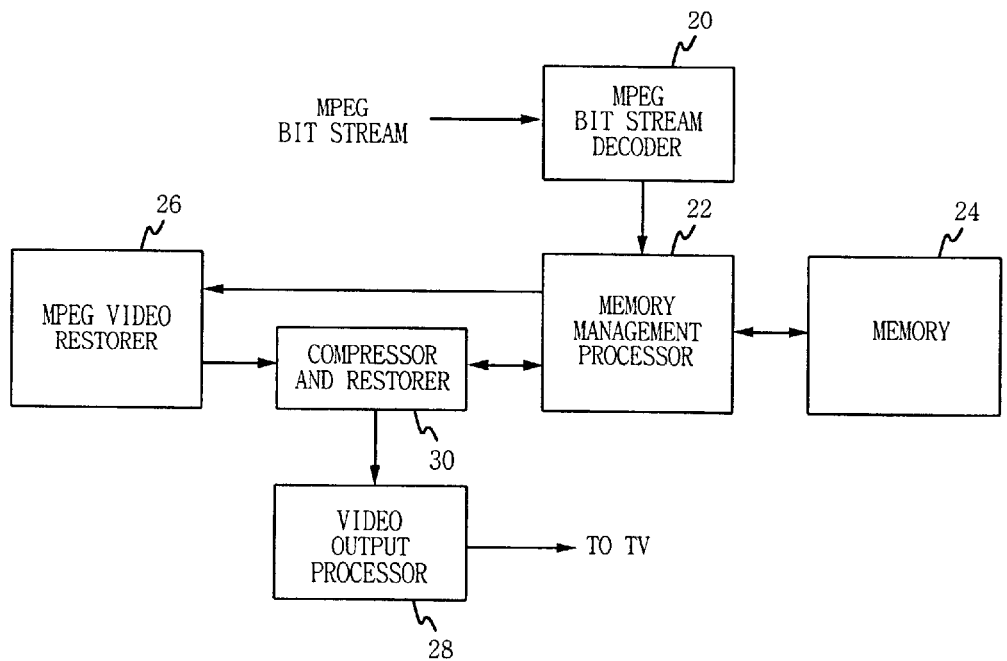
FIG. 2 is a block diagram of an MPEG system decoder according to the present invention.

FIG. 2 is a block diagram illustrating an MPEG system decoder according to the present invention. Referring to FIG. 2, a system decoder according to the present invention includes an MPEG bitstream decoder 20, a memory management processor 22, a memory 24, an MPEG video restorer 26, a video output processor 28, and a compressor and restorer 30.

The memory management processor 22 stores the MPEG-compressed video data separated by the MPEG bitstream decoder 20 in the memory 24. The memory management processor 22 then outputs the compressed video data stored in the memory 24 to the MPEG video restorer 26. The MPEG video restorer 26 restores (decompresses) the compressed video data and outputs the restored video data to the compressor and restorer 30. The compressor and restorer 30 compresses the restored video data by adjacent data value differencing or division, and outputs the compressed video data to the memory management processor 22. The memory management processor 22 stores the video data output from the compressor and restorer 30 in a restored data storage region of the memory 24. The memory management processor 22 outputs the video data stored in the restored data storage region of the memory 24 to the compressor and restorer 30. The compressor and restorer 30 restores (decompresses) the video data from the memory 24, and outputs the restored video data to the video output processor 28. The video output processor 28 outputs the restored video data to a display such as a television.

Operations for various aspects of one embodiment of the present invention are illustrated in detail in FIGS. 3A, 3B, 5, 6A, 6B and 8 which are flowchart illustrations. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps such as was described in FIG. 2, or by combinations of special purpose hardware and computer instructions.

Figure 3A:
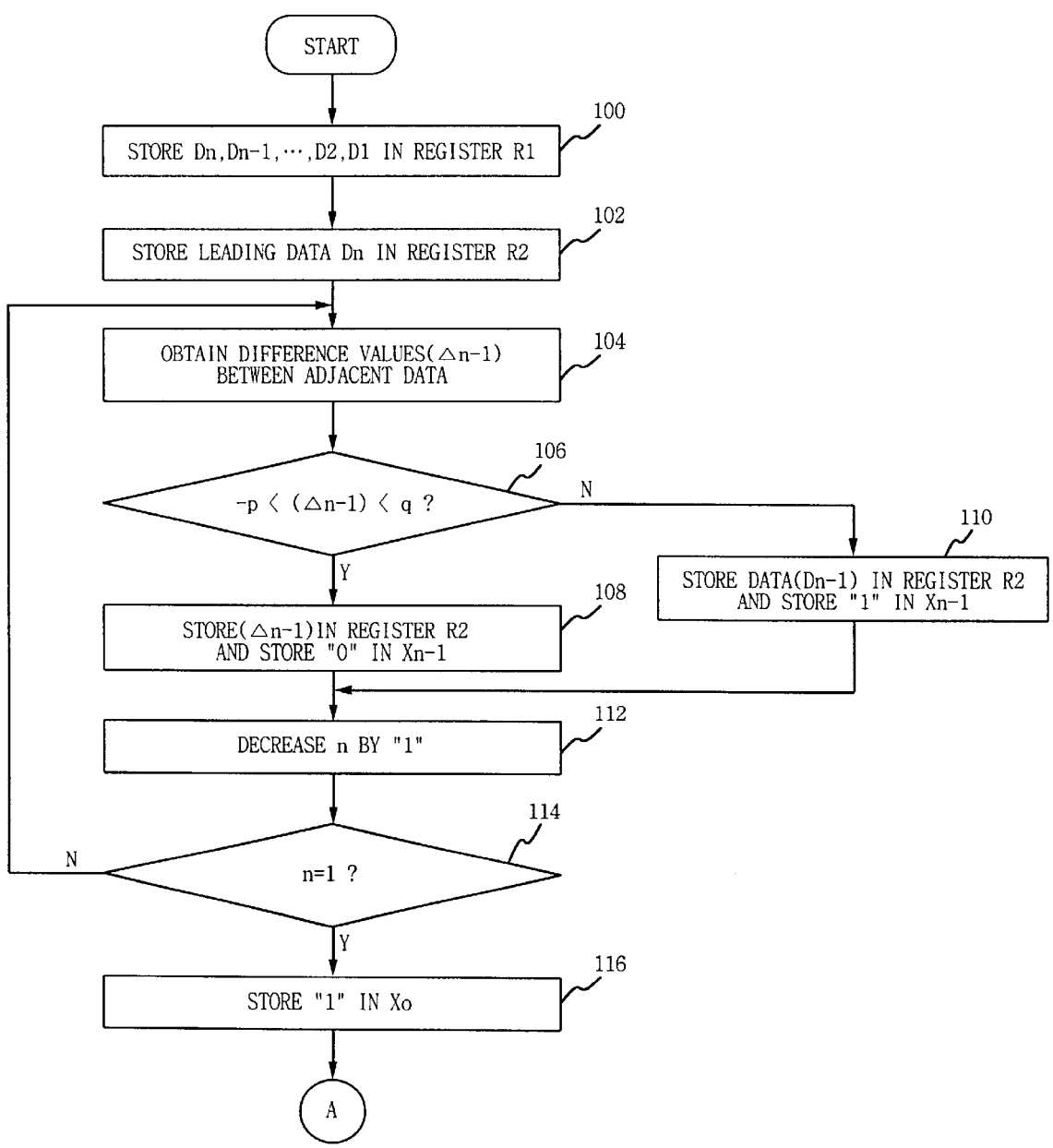
FIGS. 3A and 3B are a flowchart of video data compression according to the present invention.
Figure 3B:
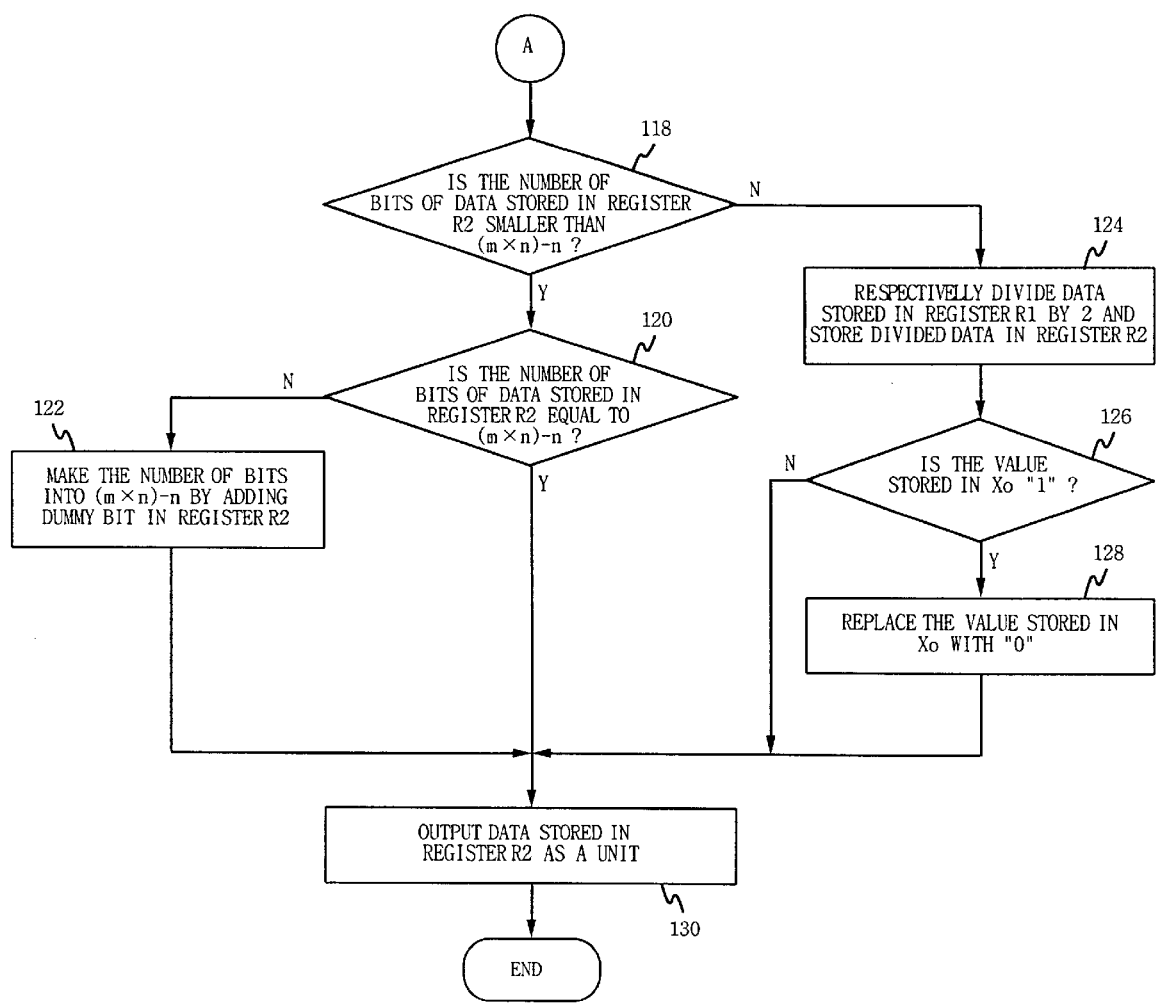
Figure 4A:
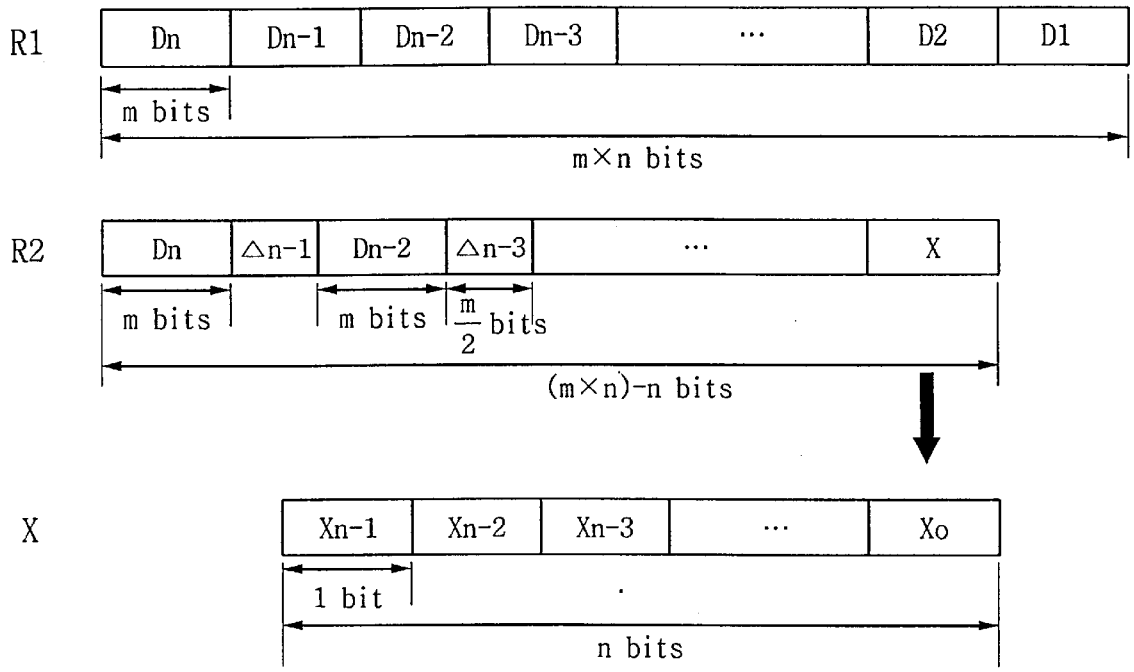
FIGS. 4A and 4B are views explaining video data compression utilizing difference values and division of FIGS. 3A and 3B.
Figure 4B:
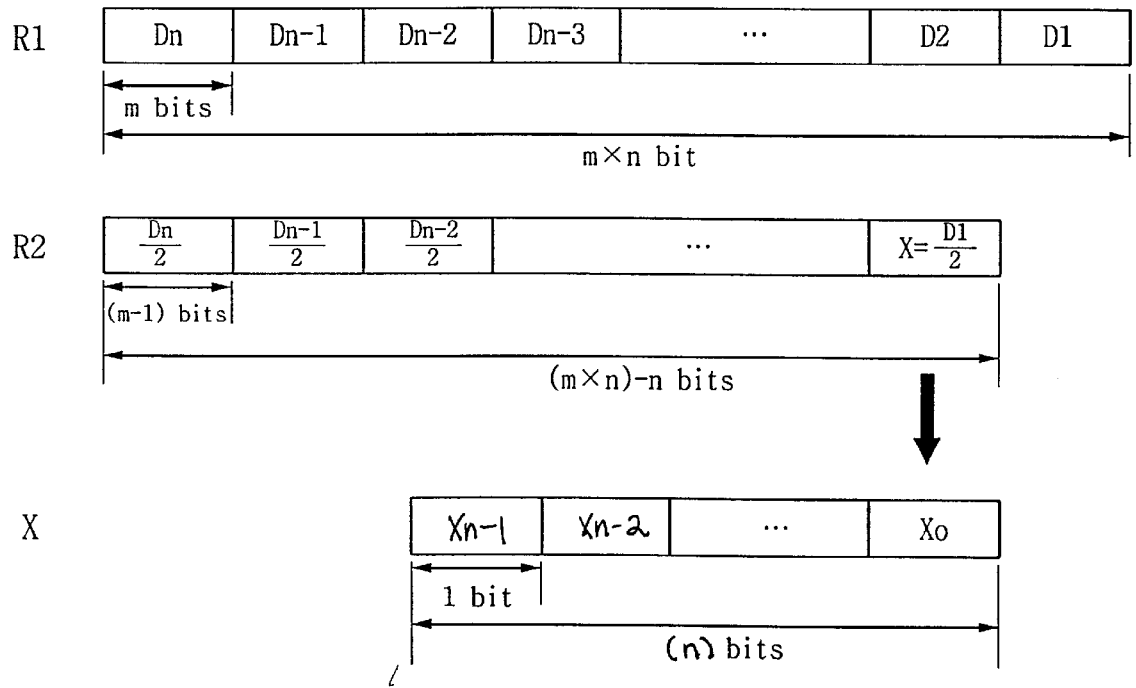

FIGS. 3A and 3B are a flowchart explaining video data compression that can be performed by the compressor and restorer in FIG. 2. FIG. 4A is a view explaining video data compression of FIGS. 3A and 3B when the compressed data is less than (m×n)−n bits, and FIG. 4B is a view explaining video data compression when the compressed data exceeds (m×n)−n bits.

The n data values of m bits $D_n$, $D_{n-1}$ . . . $D_2$, $D_1$ output from the MPEG video restorer 26 are stored in a register R1 (Block 100). The register R1 can store therein m×n-bit data. The data $D_n$ stored in the register R1 is then stored in a register R2 as shown in FIG. 4A (Block 102). The register R2 can store therein (m×n)−n-bit data. Thereafter, a data difference value $\Delta_{n-1}$ is obtained by subtracting adjacent data $D_{n-1}$ from leading data $D_n$ based on the leading data $D_n$ of the restored data (Block 104). The adjacent data differencing (subtracting) operation is also referred to herein as Differential Pulse-Code Modulation (DPCM).

Next, it is determined whether the data difference value is within a predetermined range, i.e., whether the data difference value satisfies the condition of $-p<\Delta_{n-1}<q$ (Block 106). Here, the values of p and q are preferably determined for the effective data compression. A specific example will be given below.

If the obtained data difference value $\Delta_{n-1}$ satisfies the condition of $-p<\Delta_{n-1}<q$, it is stored in the register R2 as shown in FIG. 4A, and "0" is stored in an $X_{n-1}$ position of an X region of the register R2 as shown in FIG. 4A in order to represent that the data is compressed information (Block 108). The X region of the register R2 can store n-bit data. The positions $X_{n-1}$ to $X_1$ of the X region store therein the conversion flag bits, which represent whether or not the stored data $D_{n-1}$, $D_{n-2}$, . . . , $D_1$ have been compressed. If the conversion flag bit is "1", it indicates that the stored data has been compressed, while if it is "0", it indicates that the stored data has not been compressed. The least significant bit (LSB) $X_0$ stores therein a conversion mode flag bit. If the conversion mode flag bit is "1", it indicates that the data has been compressed by DPCM (differencing), while if it is "0", it means that the data has been compressed by division as described below.

If the obtained data difference value $\Delta_{n-1}$ does not satisfy the condition of $-p<\Delta_{n-1}<q$ as a result of determination at Block 106, the data $D_{n-1}$ is stored in the register R2, and "1" is stored in the position of $X_{n-1}$ (Block 110). After the operation of Block 108 or 110 is performed, the value of n is decreased by 1 (Block 112). It is determined if n is "1", and if not, Blocks 104 to 112 are repeatedly performed (Block 114). If it is determined that n is "1", a "1" is stored in the position of $X_0$ to represent that the data has been converted by DPCM (Block 116).

Thereafter, it is determined whether or not the bit number of the data stored in the register R2 is smaller than (m×n)−n bits (Block 118). If so, it is determined whether or not the bit number of the data stored in the register R2 is equal to (m×n)−n bits (Block 120). If so, the data stored in the register R2 is maintained as is. That is, the register R2 stores the n converted data, conversion flags, and conversion mode flag, preferably in that order. If the bit number of the data stored in the register R2 is less than (m×n)−n bits, the bit number of the data is expanded to (m×n)−n by adding one or more dummy bits to the data in the register R2 (Block 122). Thus, the data is composed of the n compressed data, dummy bits, conversion flags, and conversion mode flag stored in the register R2, preferably in that order.

If it is determined that the bit number of the data stored in the register R2 is not smaller than (m×n)−n bits at Block 118, the respective data stored in the register R1 are divided by 2, respectively, and the divided data are stored in the register R2 as shown in FIG. 4B (Block 124). It is determined whether the value stored in the $X_0$ position of the X region of the register R2 is "1" (Block 126). As shown in FIG. 4B, in the X region respective data of n bits are stored, which are produced by dividing the n bit data stored in the register R1 by 2, respectively. If the value stored in the $X_0$ position is "1", it is replaced by "0" (Block 128). If the value stored in the $X_0$ position, which is the conversion mode flag data, is "0", it indicates that the data has been compressed by division. After the Blocks 120, 122, or 128 are performed, or if it is determined that the value stored in the $X_0$ position of the X region of the register R2 is not "1" at Block 126, the data stored in the register R2 are output as a unit (Block 130).

Figure 5:
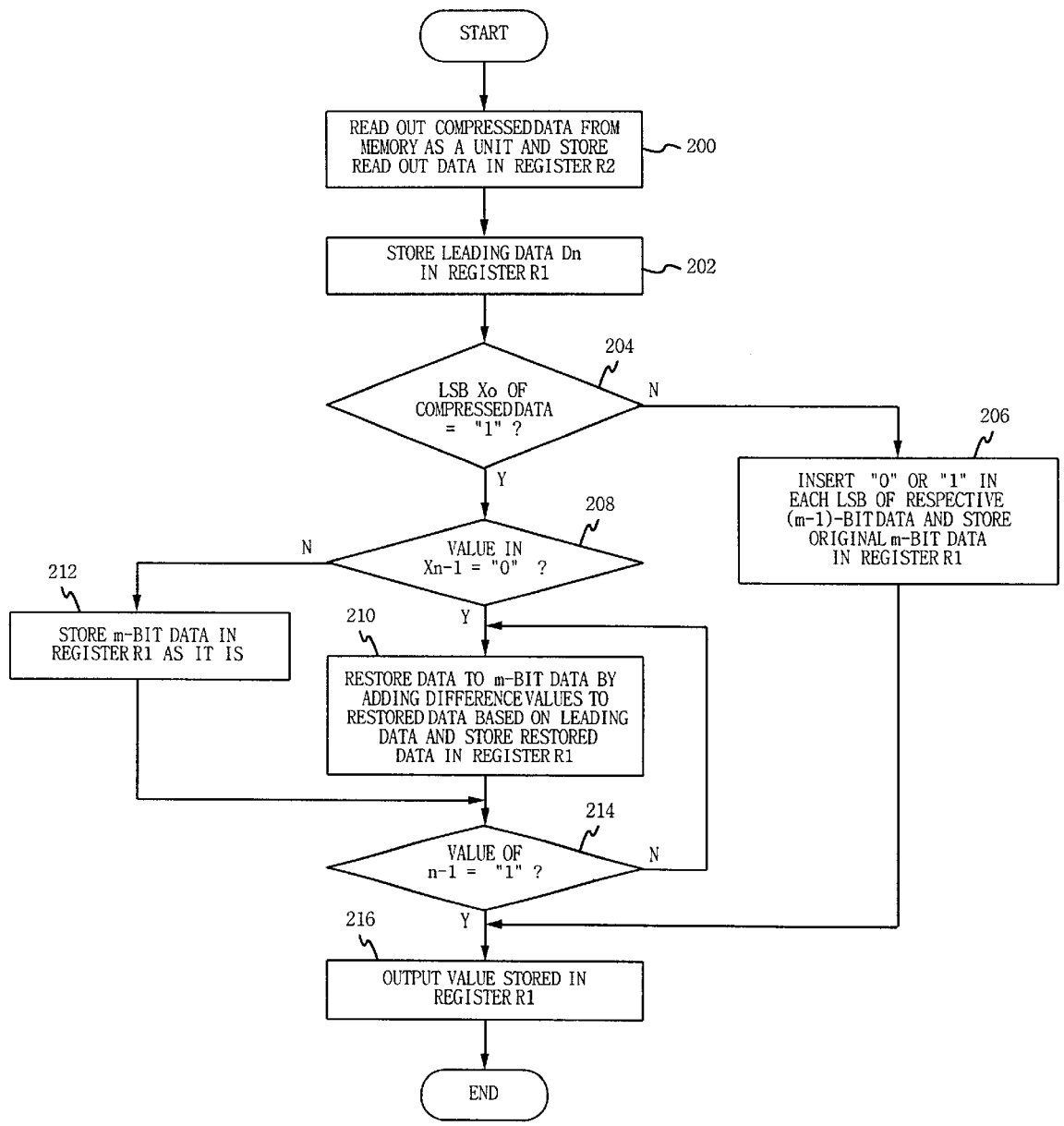
FIG. 5 is a flowchart explaining video data restoring according to the present invention.

FIG. 5 illustrates a flowchart explaining video data restoring (decompression) that can be performed by the compressor and restorer in FIG. 2. The video data restoring will be explained with reference to FIGS. 4A and 4B.

First, the compressed data are read out from the memory 24 in FIG. 2 as a unit, and the read-out data are stored in the register R2 (Block 200). The leading data $D_n$ is stored in the register R1 (Block 202). Thereafter, it is checked whether or not the value of the LSB $X_0$ is "1" (Block 204). If the LSB is not "1" as a result of checking at Block 204, "0" or "1" is added to the LSB of the respective (m−1)-bit data, and the resultant m-bit data are stored in the register R1 (Block 206). Otherwise, if the LSB is "1" as a result of checking at Block 204, it is checked whether or not the value of $X_{n-1}$ is "0" (Block 208). If the value of $X_{n-1}$ is "0", the data are restored to the m-bit data by adding the difference values to the restored data based on the leading data, and the restored m-bit data are stored in the register R1 (Block 210). Otherwise, if the value of $X_{n-1}$ is not "0", the m-bit data are stored in the register R1 as is (Block 212). Thereafter, it is checked whether or not the value of n−1 is "1" after the operations of Blocks 210 or 212 are performed (Block 214). If the value of n−1 is not "1", the operation of Block 208 is performed. If the value of n−1 is "1", or after the operation of Block 206 is performed, the value stored in the register R1 is output (Block 216).

Figure 6A:
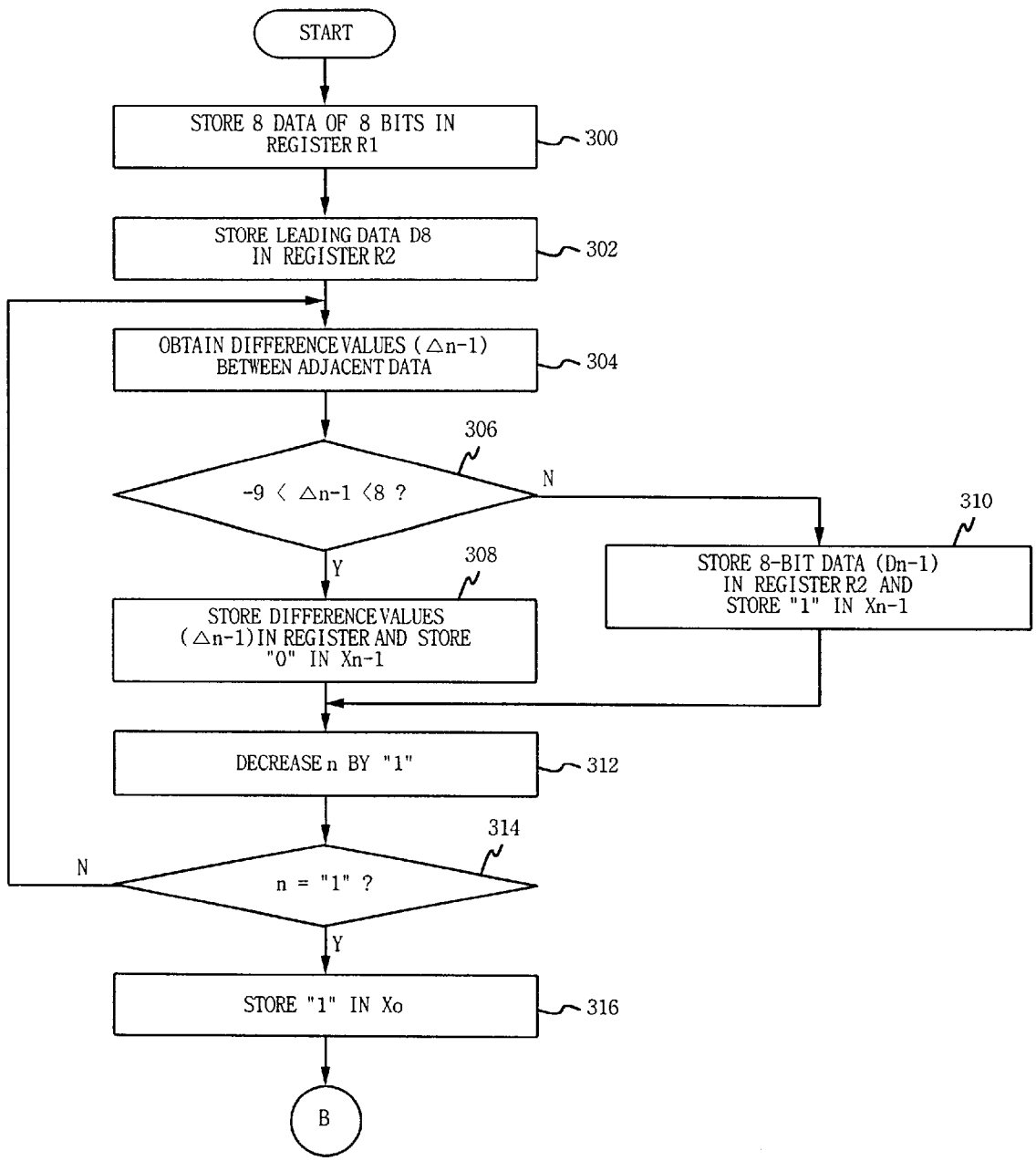
FIGS. 6A and 6B are a flowchart explaining data compression according to an embodiment of the present invention.
Figure 6B:
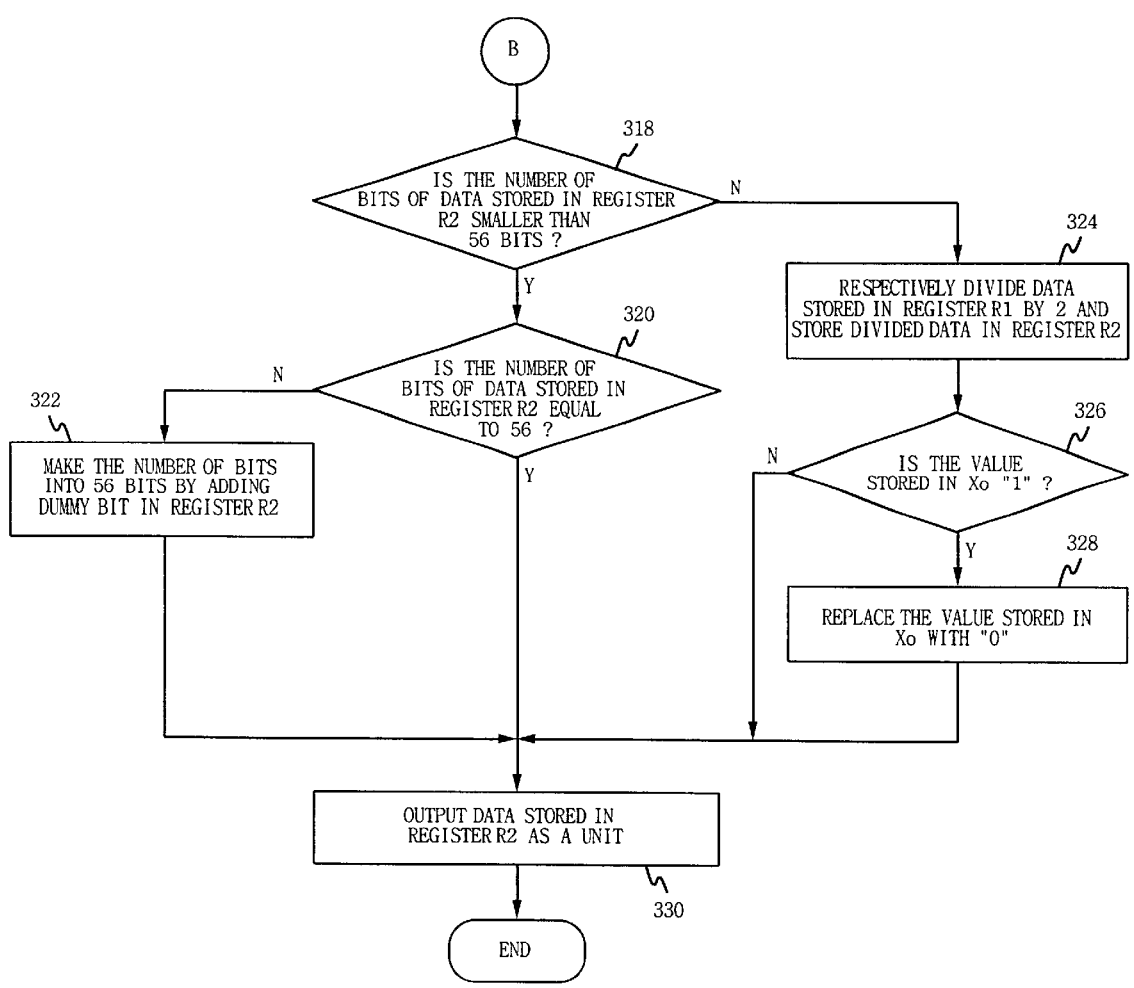

FIGS. 6A and 6B are a flowchart explaining a specific example of compressing 8 data values of 8 bits each, that can be performed by one embodiment of the compressor and restorer in FIG. 2. The data compressing will be explained with reference to FIGS. 7A, 7B, and 7C.

Figure 7A:
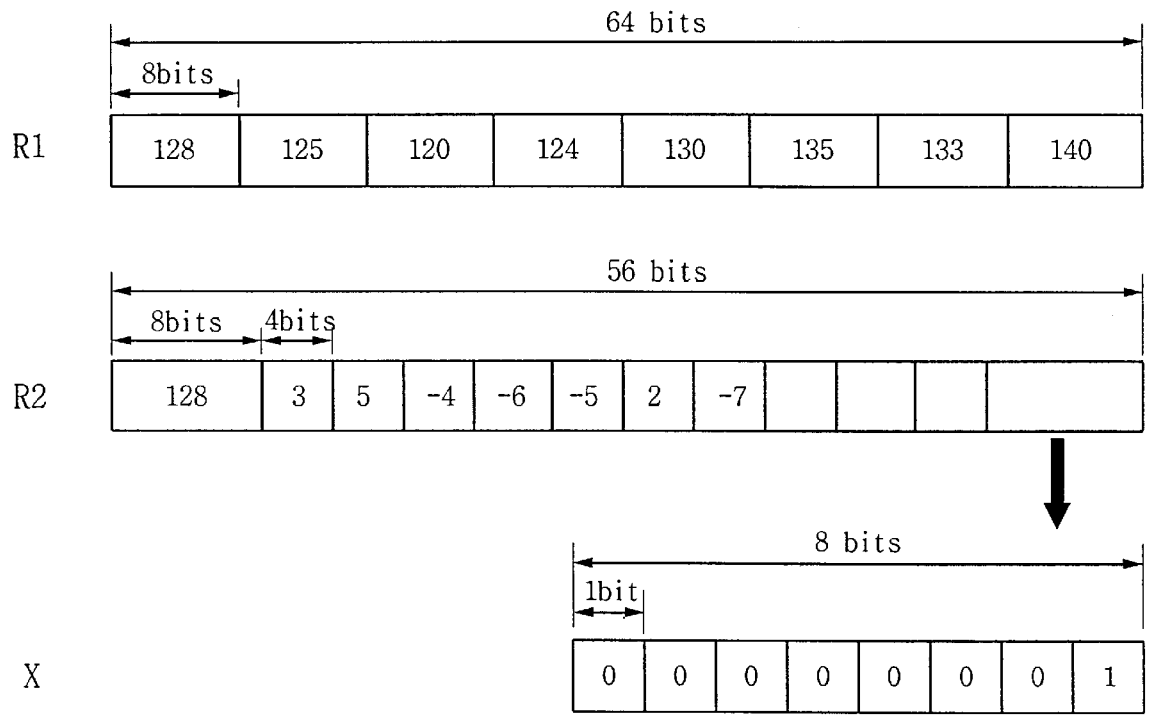

The 8 data values of 8 bits restored by the MPEG video restorer 26 are stored in the register R1 (Block 300). The leading data $D_n$ (128) stored in the register R1 as shown in FIG. 7A is stored in the register R2 (Block 302). A data difference value $\Delta_{n-1}$ is obtained by subtracting the adjacent data from the leading data 128 based on the leading data (Block 304). As a result, the data difference value of 3 is obtained.

Figure 7B:
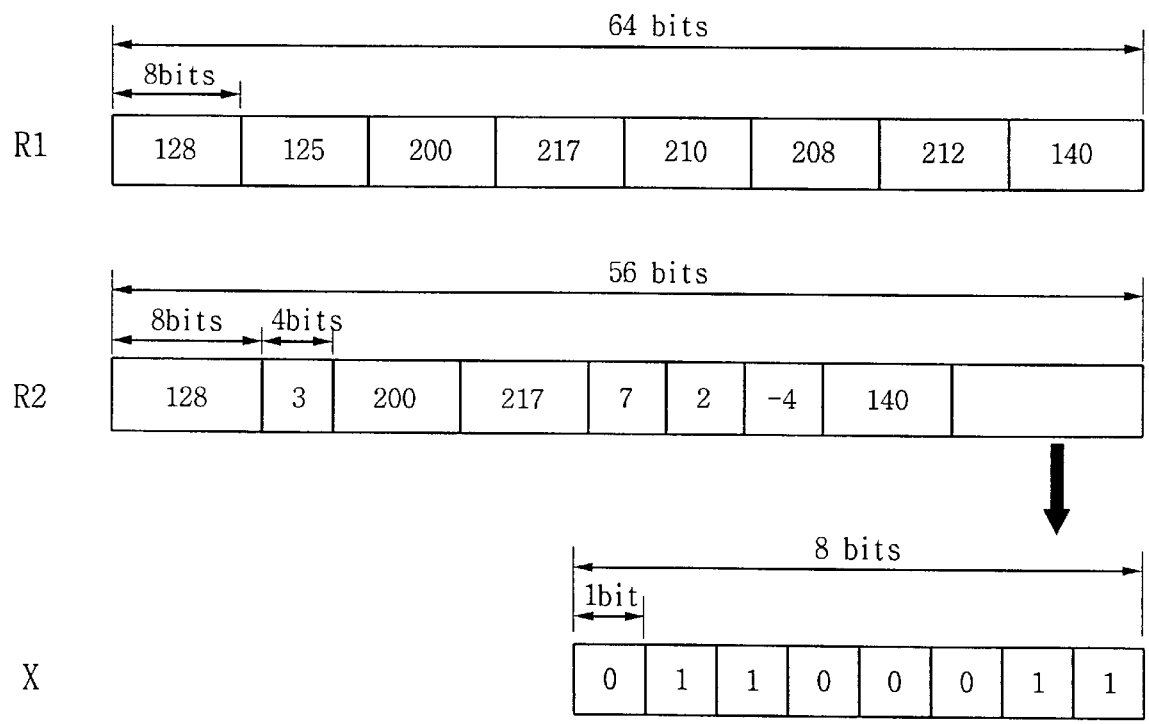
Figure 7C:
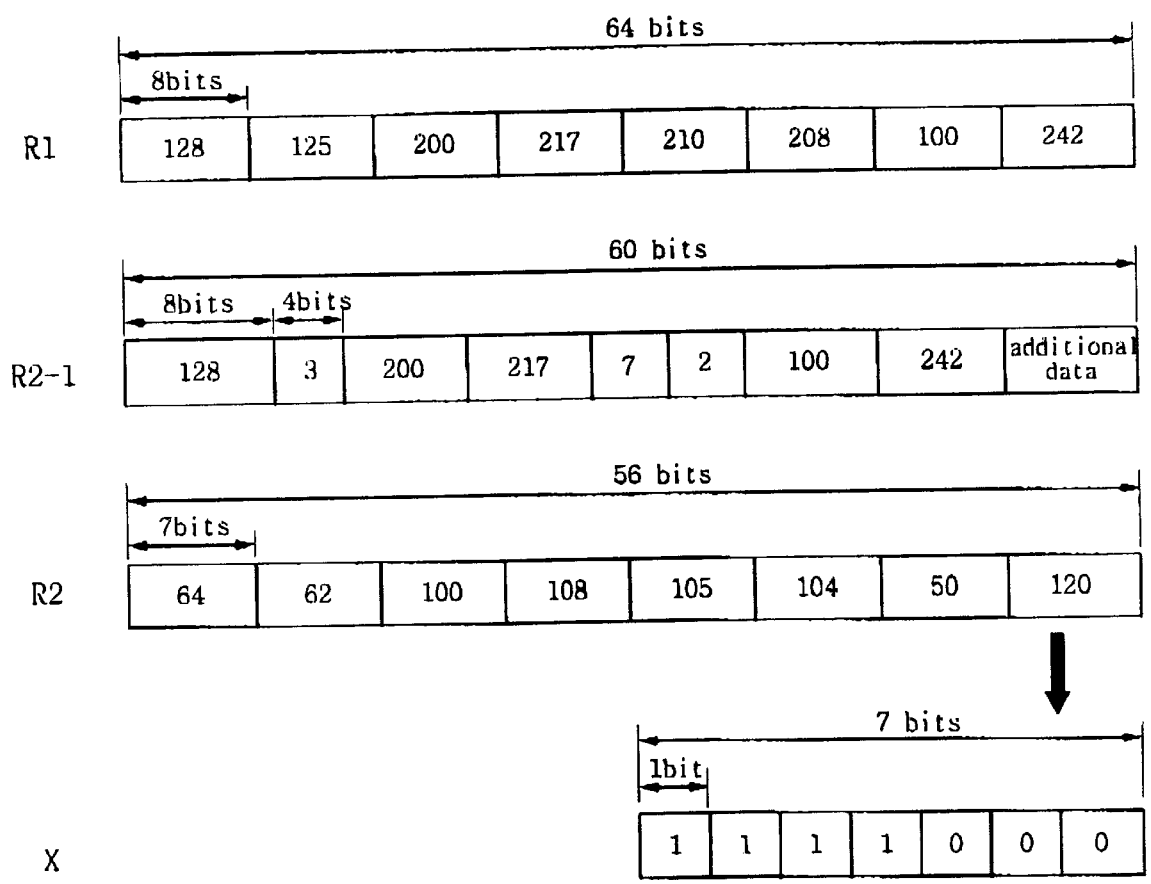

Next, it is determined whether the data difference value is within a predetermined range, i.e., whether the data difference value satisfies the condition of $-9<\Delta_{n-1}<8$ (Block 306). Since the obtained data difference value of 3 satisfies the condition of $-9<\Delta_{n-1}<8$, it is stored in the register R2, and "0" is stored in the $X_7$ (MSB) position of the X region of the register R2 (Block 308). If the obtained data difference value $\Delta_{n-1}$ does not satisfy the condition of $-9<\Delta_{n-1}<8$ as a result of determination at Block 306, the 8-bit data 125 is stored in the register R2, and "1" is stored in the $X_7$ position of the X region (Block 310). After Blocks 308 or 310 are performed, the value of n is decreased by 1 (Block 312). That is, the value of n becomes 7. It is then determined if n is "1", after Block 312 is performed (Block 314). Since the value of n is not 1, the Block 304 is performed. By performing the above process, the registers are occupied as shown in FIGS. 7A, 7B, and 7C. If it is determined that n is "1", a "1" is stored in the $X_0$ position of the X region (Block 316).

Thereafter, it is determined whether or not the bit number of the data stored in the register R2 is smaller than 56 bits (Block 318). FIGS. 7A and 7B illustrate the case that the bit number of the data stored in the register R2 is equal to and smaller than 56 bits, and FIG. 7C illustrates the case that the bit number of the data stored in the register R2 exceeds 56 bits. Thereafter, it is determined whether or not the bit number of the data stored in the register R2 is equal to 56 bits (Block 320). If not, 56 bits of data are produced by adding dummy bits in empty (blank) regions of the register R2 as shown in FIG. 7A (Block 322). If the bit number of the data is equal to 56 bits, the data stored in the register R2 is maintained as is as shown in FIG. 7B.

If it is determined that the bit number of the data stored in the register R2 is not smaller than 56 bits as a result of determination at Block 318, for example, if the bit number of the data becomes 60 bits as illustrated as the register R2-1 in FIG. 7C, the respective data stored in the register R1 are divided by 2, respectively, and the respective divided data are stored in the register R2 (Block 324). Though the registers R2-1 and R2 are illustrated differently, they have the same structure.

Then, it is determined whether the value stored in the $X_0$ position of the X region of the register R2 is "1" (Block 326). If the value stored in the $X_0$ position is "1", it is replaced by "0" (Block 328). Specifically, data 121 is obtained by dividing the last data 242 in FIG. 7C by 2, and this divided data is represented as "1111001". Since the value stored in the $X_0$ position is "1", it is replaced by "0", and then in the $X_0$ position of the X region of the register R2 "1111000" is stored. After Blocks 320, 322, or 328 is performed, or if it is determined that the value stored in the $X_0$ position of the X region of the register R2 is not "1" at Block 326, the data stored in the register F2 are output as a unit (Block 330).

Figure 8:
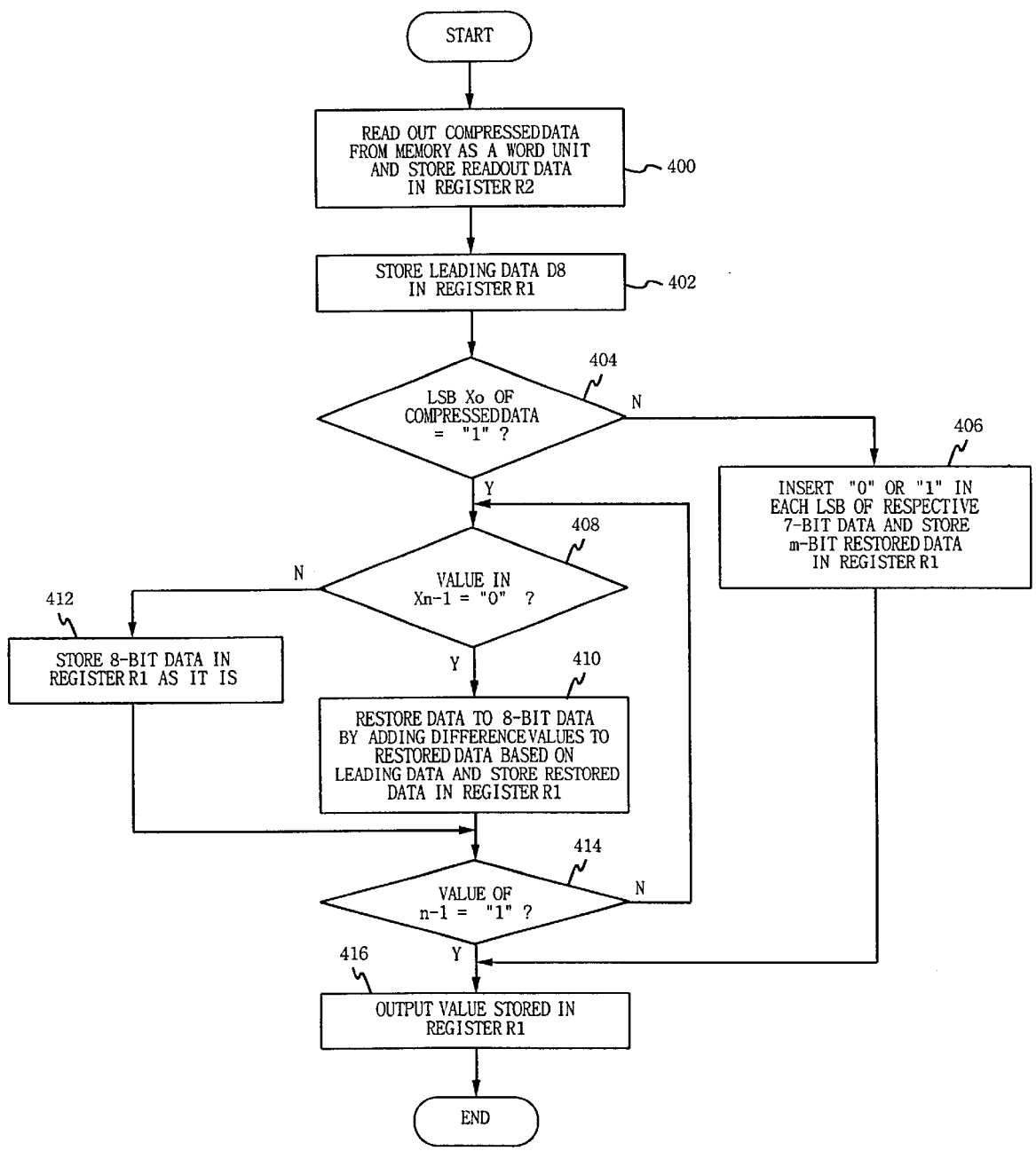
FIG. 8 is a flowchart explaining video data restoring according to the present invention.

FIG. 8 is a flowchart explaining an example of restoring (decompressing) 8 data values of 8 bits each, that may be performed by an embodiment of the compressor and restorer in FIG. 2.

First, the compressed data are read out from the memory 24 in FIG. 2 as a word unit, and the read-out data are stored in the register R2 (Block 400). The leading data $D_8$ is stored in the register R1 (Block 402). Thereafter, it is checked whether or not the value of the LSB $X_0$ is "1" (Block 404). If the LSB is not "1" as a result of checking at Block 404, "0" or "1" is added to the LSB sides of the respective 7-bit data, and the restored 8-bit data are stored in the register R1 (Block 406). The addition of a "0" or "1" to the LSB may be selected by a user to reduce loss of data. Alternatively, a "0" or "1" may be automatically added, for example by adding a "0" or "1" for alternating data values.

Otherwise, if the LSB is "1" as a result of checking at Block 404, it is checked whether or not the value of $X_{n-1}$ is "0" (Block 408). If it is determined that the value of $X_{n-1}$ is "0" at Block 408, the data is restored to the 8-bit data by adding the difference values to the restored data based on the leading data, and the restored 8-bit data are stored in the register R1 (Block 410).

Otherwise, if it is determined that the value of $X_{n-1}$ is not "0" at Block 408, the 8-bit data are stored in the register R1 as is (Block 412). Thereafter, it is checked whether or not the value of n−1 is "1" after the Block 410 or 412 is performed (Block 414). If the value of n−1 is not "1", the Block 408 is performed. If the value of n−1 is "1", or after the Block 406 is performed, the value stored in the register R1 is output (Block 416). By performing the above process, restoration or decompression of the compressed data is completed.

As described above, according to the present invention, data difference values between pixels having a high correlation among the pixels of the picture data may be obtained. Thus the amount of data to be stored may be reduced, allowing the storage capacity and the size of the memory to be reduced. Reduced cost and/or higher performance may be obtained.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of further compressing decompressed MPEG data comprising the steps of:

decompressing MPEG video data by separating a series of data values of MPEG video data from an MPEG bitstream;

compressing the data values by obtaining difference values between succeeding adjacent data values of the MPEG video data;

for each data value, storing the data value if the difference value exceeds a predetermined range and storing the difference value if the difference value is less than the predetermined range; and for each data value, storing a conversion flag to indicate whether the data value or the difference is stored.

2. A method of further compressing decompressed MPEG data comprising the steps of:

decompressing MPEG video data by separating a series of data values of MPEG video data from an MPEG bitstream;

compressing the data values by obtaining difference values between succeeding adjacent data values of the MPEG video data;

for each data value, storing the data value if the difference value exceeds a predetermined range and storing the difference value if the difference value is less than the predetermined range;

determining if the data values and difference values that were stored exceed a predetermined size;

for each data value, dividing the data value by two and storing the divided data value, if the data values and difference values that were stored exceed the predetermined size;

for each data value, storing a conversion flag to indicate whether the data value or the difference is stored.

3. A method according to claim 2 wherein the determining step is followed by the step of:
adding dummy bits to the data values and difference values that were stored if the data values and difference values that were stored are less than the predetermined size.

4. A method according to claim 2 further comprising the step of:
setting a mode flag to indicate whether difference values or divided values are stored.

5. A method according to claim 4 wherein the series of data values of MPEG video data is n data values, each of m bits, wherein each conversion flag is one bit, wherein the mode flag is one bit, and wherein the predetermined size is (m×n)−n.

6. A method according to claim 1 wherein the predetermined range is between −9 and 8.

7. A method according to claim 4 further comprising the step of adding a stored data value to an immediately preceding stored data value to obtain an associated decompressed data value if the conversion flag that is associated with the data value indicates that the difference is stored, to thereby decompress the stored data values.

8. A method according to claim 7 wherein the adding step is performed in response to the mode flag having a first value, the method further comprising the following step:
multiplying each stored data value by two if the mode flag has a second value.

9. A method of further compressing decompressed MPEG data comprising the steps of:
decompressing MPEG video data by separating a series of n data values of m bits each of MPEG video data from an MPEG bitstream to obtain m×n bits of MPEG video data;
compressing the m×n bits of MPEG video data into (m×n)−n bits using adjacent data value differencing and data value dividing; and
storing the (m×n)−n bits of compressed MPEG video data.

10. A method according to claim 9 wherein the (m×n)−n bits of compressed MPEG video data include n one-bit conversion flags to indicate whether a data value or a difference is stored for each of the n data values.

11. A method according to claim 10 wherein the (m×n)−n bits of compressed MPEG video data also include a plurality of dummy bits that increase the size of the compressed MPEG video data to (m×n)−n bits.

12. A method according to claim 11 wherein the (m×n)−n bits of compressed MPEG video data also include a one bit mode flag to indicate whether difference values or divided values are stored.

13. A method according to claim 9 further comprising the following step:
decompressing the stored (m×n)−n bits of compressed MPEG video data into a series of n data values of m bits each of decompressed MPEG video data using adjacent data value adding and data value multiplying.

14. A method of decompressing compressed MPEG data including a series of compressed data values and a conversion flag that is associated with each compressed data value, the decompressing method comprising the steps of:
adding a compressed data value to an immediately preceding decompressed data value to obtain an associated decompressed data value if the conversion flag that is associated with the compressed data value is a first value; and
defining the associated compressed data value as the associated decompressed data value otherwise.

15. A method according to claim 14 wherein the compressed MPEG data also includes a mode flag, and wherein the adding and defining steps are performed in response to the mode flag having a first value, the method further comprising the following step:
multiplying each compressed data value by two to obtain an associated decompressed data value, if the mode flag has a second value.

16. Apparatus for further compressing decompressed MPEG data comprising:
an MPEG bitstream decoder that decompresses MPEG video data by separating a series of data values of MPEG video data from an MPEG bitstream; and
a compressor and restorer that obtains difference values between succeeding adjacent data values of the MPEG video data, that stores the data value in a first register if the difference value exceeds a predetermined range and that stores the difference value in the first register if the difference value is less than the predetermined range;
the compressor and restorer also storing a conversion flag in a second register for each data value to indicate whether the data value or the difference is stored.

17. Apparatus for further compressing decompressed MPEG data comprising:
an MPEG bitstream decoder that decompresses MPEG video data by separating a series of data values of MPEG video data from an MPEG bitstream; and
a compressor and restorer that obtains difference values between succeeding adjacent data values of the MPEG video data, that stores the data value in a first register if the difference value exceeds a predetermined range and that stores the difference value in the first register if the difference value is less than the predetermined range;
the compressor and restorer also storing a conversion flag in a second register for each data value to indicate whether the data value or the difference is stored;
wherein the compressor and restorer also determines if the data values and difference values that were stored in the first register exceed a predetermined size, and divides each data value by two and stores the divided data values in the first register, if the data values and difference values that were stored in the first register exceed the predetermined size.

18. Apparatus according to claim 17 wherein the compressor and restorer also adds dummy bits to the data values and difference values that were stored in the first register if the data values and difference values that were stored in the first register are less than the predetermined size.

19. Apparatus according to claim 17 wherein the compressor and restorer also sets a mode flag to indicate whether difference values or divided values are stored in the first register.

20. Apparatus according to claim 19 wherein the series of data values of MPEG video data is n data values, each of m bits, wherein each conversion flag is one bit, wherein the mode flag is one bit, and wherein the predetermined size is (m×n)−n.

21. Apparatus according to claim 16, wherein the predetermined range is between −9 and 8.

22. Apparatus according to claim 19 wherein the compressor and restorer also adds a stored data value in the first register to an immediately preceding stored data value in the first register to obtain an associated decompressed data value if the conversion flag in the second register that is associated with the data value indicates that the difference is stored, to thereby decompress the stored data values.

23. Apparatus according to claim 22 wherein the adding is performed by the compressor and restorer in response to the mode flag having a first value, and wherein the compressor and restorer multiplies each stored data value in the first register by two if the mode flag has a second value.

24. Apparatus for further compressing decompressed MPEG data comprising:
   an MPEG bitstream decoder that decompresses MPEG video data by separating a series of n data values of m bits each of MPEG video data from an MPEG bitstream to obtain m×n bits of MPEG video data; and
   a compressor and restorer that compresses the m×n bits of MPEG video data into (m×n)−n bits using adjacent data value differencing and data value dividing, and that stores the (m×n)−n bits of compressed MPEG video data in a register.

25. Apparatus according to claim 24 wherein the (m×n)−n bits of compressed MPEG video data include n one-bit conversion flags to indicate whether a data value or a difference is stored in the register for each of the n data values.

26. Apparatus according to claim 25 wherein the (m×n)−n bits of compressed MPEG video data in the register also include a plurality of dummy bits that increase the size of the compressed MPEG video data to (m×n)−n bits.

27. Apparatus according to claim 26 wherein the (m×n)−n bits of compressed MPEG video data in the register also include a one bit mode flag to indicate whether difference values or divided values are stored.

28. Apparatus according to claim 24 wherein the compressor and restorer also decompress the stored (m×n)−n bits of compressed MPEG video data in the register into a series of n data values of m bits each of decompressed MPEG video data using adjacent data value adding and data value multiplying.

29. Apparatus for decompressing compressed MPEG data comprising:
   a memory that stores a series of compressed data values and a conversion flag that is associated with each compressed data value; and
   a restorer that adds a compressed data value to an immediately preceding decompressed data value to obtain an associated decompressed data value if the conversion flag that is associated with the compressed data value is a first value, and that defines the associated compressed data value as the associated decompressed data value otherwise.

30. Apparatus according to claim 29 wherein the compressed MPEG data also includes a mode flag, and wherein the restorer is responsive to the mode flag having a first value, the restorer multiplying each compressed data value by two to obtain an associated decompressed data value, if the mode flag has a second value.

31. Apparatus for decompressing compressed MPEG data comprising:
   a memory that stores (m×n)−n bits of compressed MPEG video data; and
   a restorer that decompresses the (m×n)−n bits of compressed MPEG video data into a series of n data values of m bits each of decompressed MPEG video data using adjacent data value adding and data value multiplying.

32. Apparatus according to claim 31 wherein the (m×n)−n bits of compressed MPEG video data include n one-bit conversion flags to indicate whether the data value or adjacent data value adding is used to decompress each of the n data values.

33. Apparatus according to claim 32 wherein the (m×n)−n bits of compressed MPEG video data also include a plurality of dummy bits that increase the size of the compressed MPEG video data to (m×n)−n bits.

34. Apparatus according to claim 33 wherein the (m×n)−n bits of compressed MPEG video data also include a one bit mode flag to indicate whether added values or multiplied values are stored.

35. A computer program product for further compressing decompressed MPEG data comprising:
   a computer-readable storage medium having computer-readable program code means embodied in the medium, the computer-readable program code means comprising:
   computer-readable program code means for decompressing MPEG video data by separating a series of data values of MPEG video data from an MPEG bitstream;
   computer-readable program code means for compressing the data values by obtaining difference values between succeeding adjacent data values of the MPEG video data;
   computer-readable program code means for storing the data value if the difference value exceeds a predetermined range and for storing the difference value if the difference value is less than the predetermined range, for each data value; and
   computer-readable program code means for storing a conversion flag for each data value to indicate whether the data value or the difference is stored.

36. A computer program product for further compressing decompressed MPEG data comprising:
   a computer-readable storage medium having computer-readable program code means embodied in the medium, the computer-readable program code means comprising:
   computer-readable program code means for decompressing MPEG video data by separating a series of data values of MPEG video data from an MPEG bitstream;
   computer-readable program code means for compressing a the data values by obtaining difference values between succeeding adjacent data values of the MPEG video data,
   computer-readable program code means for storing the data value if the difference value exceeds a predetermined range and for storing the difference value if the difference value is less than the predetermined range, for each data value;
   computer-readable program code means for storing a conversion flag for each data value to indicate whether the data value or the difference is stored;
   computer-readable program code means for determining if the data values and difference values that were stored exceed a predetermined size; and
   computer-readable program code means for dividing each data value by two and storing the divided data value, if the data values and difference values that were stored exceed the predetermined size.

37. A computer program product according to claim 36 further comprising:
   computer-readable program code means for adding dummy bits to the data values and difference values that were stored if the data values and difference values that were stored are less than the predetermined size.

38. A computer program product according to claim 36 further comprising:

computer-readable program code means for setting a mode flag to indicate whether difference values or divided values are stored.

39. A computer program product according to claim 38 wherein the series of data values of MPEG video data is n data values, each of m bits, wherein each conversion flag is one bit, wherein the mode flag is one bit, and wherein the predetermined size is (m×n)−n.

40. A computer program product according to claim 35 wherein the predetermined range is between −9 and 8.

41. A computer program product according to claim 38 further comprising:

computer-readable program code means for adding a stored data value to an immediately preceding stored data value to obtain an associated decompressed data value if the conversion flag that is associated with the data value indicates that the difference is stored, to thereby decompress the stored data values.

42. A computer program product according to claim 41 wherein the computer-readable program code means for adding is responsive to the mode flag having a first value, the computer program product further comprising:

computer-readable program code means for multiplying each stored data value by two if the mode flag has a second value.

43. A computer program product for further compressing decompressed MPEG data comprising:

a computer-readable storage medium having computer-readable program code means embodied in the medium, the computer-readable program code means comprising:

computer-readable program code means for decompressing MPEG video data by separating a series of n data values of m bits each of MPEG video data from an MPEG bitstream to obtain m×n bits of MPEG video data;

computer-readable program code means for compressing the m×n bits of MPEG video data into (m×n)−n bits using adjacent data value differencing and data value dividing; and computer-readable program code means for storing the (m×n)−n bits of compressed MPEG video data.

44. A computer program product according to claim 43 wherein the (m×n)−n bits of compressed MPEG video data include n one-bit conversion flags to indicate whether a data value or a difference is stored for each of the n data values.

45. A computer program product according to claim 44 wherein the (m×n)−n bits of compressed MPEG video data also include a plurality of dummy bits that increase the size of the compressed MPEG video data to (m×n)−n bits.

46. A computer program product according to claim 45 wherein the (m×n)−n bits of compressed MPEG video data also include a one bit mode flag to indicate whether difference values or divided values are stored.

47. A computer program product according to claim 43 further comprising:

computer-readable program code means for decompressing the stored (m×n)−n bits of compressed MPEG video data into a series of n data values of m bits each of decompressed MPEG video data using adjacent data value adding and data value multiplying.

48. A computer program product for decompressing compressed MPEG data including a series of compressed data values and a conversion flag that is associated with each compressed data value, the computer program product comprising:

a computer-readable storage medium having computer-readable program code means embodied in the medium, the computer-readable program code means comprising:

computer-readable program code means for adding a compressed data value to an immediately preceding decompressed data value to obtain an associated decompressed data value if the conversion flag that is associated with the compressed data value is a first value; and computer-readable program code means for defining the associated compressed data value as the associated decompressed data value otherwise.

49. A computer program product according to claim 48 wherein the compressed MPEG data also includes a mode flag, and wherein the computer-readable program code means for adding and the computer-readable program code means for defining are responsive to the mode flag having a first value, the computer program product further comprising:

computer-readable program code means for multiplying each compressed data value by two to obtain an associated decompressed data value, if the mode flag has a second value.

* * * * *